United States Patent [19]
Gulick

[11] Patent Number: 5,845,085
[45] Date of Patent: Dec. 1, 1998

[54] SYSTEM FOR RECEIVING A DATA STREAM OF SERIALIZED DATA

[75] Inventor: Dale E. Gulick, Austin, Tex.

[73] Assignee: Advanced Micro Devices, Inc., Sunnyvale, Calif.

[21] Appl. No.: 316,803

[22] Filed: Oct. 3, 1994

Related U.S. Application Data

[63] Continuation of Ser. No. 992,571, Dec. 18, 1992, abandoned.

[51] Int. Cl.$^6$ .................................................. G06F 13/00
[52] U.S. Cl. ................................ 395/200.66; 395/200.8; 395/800.36
[58] Field of Search ........................... 395/200.17, 800, 395/800.36, 200.66, 200.8, 185.06; 371/37.02

[56] References Cited

U.S. PATENT DOCUMENTS

| | | | |
|---|---|---|---|
| 4,261,035 | 4/1981 | Raymond | 395/200.66 |
| 4,358,825 | 11/1982 | Kyu et al. | 395/286 |
| 4,700,358 | 10/1987 | Duncanson et al. | 375/222 |
| 4,939,741 | 7/1990 | Miyazaki | 371/37.1 |
| 5,048,012 | 9/1991 | Gulick et al. | 370/77 |
| 5,121,390 | 6/1992 | Farrell et al. | 370/94.1 |
| 5,128,945 | 7/1992 | Enns et al. | 371/37.1 |
| 5,153,884 | 10/1992 | Lucak et al. | 371/32 |
| 5,195,093 | 3/1993 | Tarrab et al. | 371/3 |
| 5,327,436 | 7/1994 | Miyazaki | 371/37.1 |
| 5,357,513 | 10/1994 | Kay et al. | 370/95.3 |
| 5,410,536 | 4/1995 | Shah et al. | 370/13 |

*Primary Examiner*—Larry D. Donaghue
*Assistant Examiner*—John Follansbee
*Attorney, Agent, or Firm*—Jenkens & Gilchrist, P.C.

[57] ABSTRACT

A high-level data-link controller (HDLC) receiver state machine for controlling the data-receiving functions of a HDLC receiver which receives frames of serialized data over a data-link. The state machine comprises a single logic device on an integrated circuit which is capable of determining in-frame status of received data, performing zero-deletions when the received data are in-frame, detecting abort signals within the received data, and controlling the overall functions of the receiver. The state machine may be utilized in a simplified HDLC receiver comprising the state machine, a shift register for converting serialized data into parallel data, a cyclical redundancy check (CRC) checker for validating the frames of received data, and a first-in, first-out (FIFO) buffer for storing the parallel data until the data are read by a controlling microprocessor.

11 Claims, 6 Drawing Sheets

FIG. 9

| 7 | 6 | 5 | 4 | 3 | 2 | 1 | 0 |
|---|---|---|---|---|---|---|---|
| GLOBAL HDLC INTRUPT ENABLE | HDLC ENABLE | RSVD | RECEIVE FRAME REJECT | RSVD | FLAG/MARK IDLE SELECT | XMIT ABORT | RSVD |

FIG. 10

| 7 | 6 | 5 | 4 | 3 | 2 | 1 | 0 |
|---|---|---|---|---|---|---|---|
| RSVD | RSVD | RSVD | ABORT RECVD | INVALID PACKET RCVD | EOM | RECV FIFO OVERRUN | RECV FIFO DATA AVAIL |

FIG. 11

| 7 | 6 | 5 | 4 | 3 | 2 | 1 | 0 |
|---|---|---|---|---|---|---|---|
| RSVD | RSVD | RSVD | ABORT RCVD | INVALID PACKET RCVD | EOM | RECV FIFO OVERRUN | RECV FIFO DATA AVAIL | ns
SYSTEM FOR RECEIVING A DATA STREAM OF SERIALIZED DATA

This is a continuation of application Ser. No. 07/992,571, filed Dec. 18, 1992 now abandoned.

BACKGROUND OF THE INVENTION

1. Field of the Invention

The invention relates to data link controllers and, more particularly, to a receiver for a high-level data-link controller which is capable of performing flag and abort detections, in-frame and out-of-frame determinations, zero-deletions, and several higher level controlling functions in one simple logic device.

1. History of the Prior Art

In modern data communication systems, data is often transmitted from a data-link transmitter at one site to a data-link receiver at another site in "packets" or "frames" of information. One such data communication system is known as a high-level data-link controller (HDLC). HDLC controllers are implemented as integrated circuits (ICs) and provide HDLC framing, cyclical redundancy check (CRC) generation and checking, zero insertion/deletion, and flag and mark idling.

Data to be sent over an HDLC link is stored on the transmitter end in memory, and moved to a series of first-in, first-out (FIFO) buffers by a processor. Under the direction of an HDLC controller, the HDLC transmitter formats the serial data into data packets, adds frame opening and frame closing flags to each packet to form frames, and transmits the frames to an HDLC receiver. The receiver strips off the opening and closing flags, de-formats the data back to serial form, and stores the data in FIFO buffers until needed by a receiving processor.

The HDLC transmitter designates frames through the use of "flag" characters. A frame flag may function as an opening flag for a frame, a closing flag for a frame, or an inter-frame fill character. A flag comprises eight bits consisting of a zero (0) followed by six ones (111111) and another zero (0). The HDLC controller directs the transmitter to send at least one flag between frames.

FIG. 1 illustrates the basic HDLC format for a frame 10 used in existing HDLC systems. All valid frames must begin with a frame opening flag 11 which indicates the beginning of the frame 10. The opening flag 11 is the last, and maybe only, flag before a non-flag, non-abort character. An address character 12 of 1-to-N bytes follows the opening flag 11. A control character 13 of 1-to-2 bytes follows the address 12. Any information 14, carried by the packet 17 within the frame 10, follows the control character 13. Next, a frame check sequence (FCS) 15 is transmitted. The FCS 15 is a 16-bit word produced by a cyclical redundancy check (CRC) generator associated with the HDLC transmitter, and is checked by a CRC checker in the HDLC receiver in order to validate the received frame. In some applications, the FCS may be 32 bits in length. Finally, the last field in the frame is a closing flag 16. The frame closing flag 16 indicates the end of the frame 10 and signals that the FCS 15 should be checked.

Data frames may be of varying length. The minimum length of any data frame is protocol specific, but is usually on the order of 4–6 bytes. If a frame is received by an HDLC receiver with less than the 4–6 bytes required by the system protocol, then a "short frame" is recognized and discarded. In theory, there is no maximum length of a frame, as long as the length exceeds the minimum protocol requirement, and the frame begins and ends with an opening flag and closing flag respectively. In practice, however, there is a maximum practical length of a frame which is controlled by the size of the receiver's buffers. The maximum frame length is set to prevent buffer overrun.

Since data frames may be of varying lengths, HDLC receivers continuously monitor the data bits which are received to determine if the last eight bits were a flag. Existing HDLC receivers perform this function by storing each group of eight bits in a shift register, and then running them through a comparator circuit after each bit is received. As those skilled in the art should appreciate, receipt of a single flag ends a frame, but may not signal the beginning of a new frame. The system knows that a frame has ended, and that either a new frame is about to begin or the data link is entering an idle condition.

An idle condition is a condition in which no data frames are being transmitted. There are two types of idle conditions: mark idle and flag idle. Mark idle is entered by programming the HDLC transmitter to send all ones (1). At least 15 contiguous ones indicates to third parties, who are also connected to the link, that the link is idle and available for them to transmit. Flag idle is entered by programming the HDLC transmitter to send a successive series of flag signals (01111110,01111110 . . . 01111110). Flag idle may be used instead of mark idle when it is desired to keep a connection in place during a temporary pause in the transmission of frames. Flag idle indicates to third parties that the link is only temporarily idle and is not available for them to transmit.

The HDLC transmitter may also be programmed to transmit an abort character to signal an abort condition to the HDLC receiver. An abort character consists of at least seven contiguous ones (1111111). An abort condition is an action taken in response to the receipt of an abort character while the receiver is in-frame. A receiver is in-frame after receiving an opening flag and before receiving a closing flag. Upon the receipt of an in-frame abort character, the receiver terminates and discards the packet being received. An abort condition is recognized immediately upon receipt of the abort character, and may be implemented on either a bit boundary or a byte boundary.

The HDLC transmitter also monitors the data stream, and when five ones (11111) are transmitted in a row, the transmitter inserts a zero in the data stream so that, if the next data bit is also a one (1), the signal will not be falsely interpreted by the receiver as a flag (six ones in a row) or, in the case of two more ones, an abort signal (seven ones in a row). The extra zero has no data significance, therefore, whenever five ones appear in a row, the receiver is programmed to delete the zero which follows.

HDLC-controller ICs generally comprise a protocol stack of seven Open Systems Interconnection (OSI) layers. Layer 1 is comprised entirely of hardware. Layer 2 may be hardware, software, or a combination of hardware and software, and is the layer which actually transmits and receives the data stream. Layer 2 breaks the data stream into packets, transmits the data packets to a receiver, and verifies that the packets got there and were acknowledged as being there correctly. Layer 3 is a control layer which directs the operations of level 2 and receives acknowledgement signals therefrom upon the completion of directed tasks. The present invention is an improved implementation of level 2.

Some HDLC-controller manufacturers implement layer 2 entirely in hardware. Motorola Corporation, for example, has a HDLC-controller IC in which layer 2 is implemented entirely in hardware. These hard-wired ICs, however, have several fundamental problems. First, they are physically very large chips, which restricts the number of applications for which they are suited. Second, they are very expensive. Third, they are completely inflexible. It is critically important that HDLC ICs be flexible in order to respond to changing system requirements.

Just as some HDLC-controller manufacturers implement layer 2 entirely in hardware, some manufacturers implement layer 2 entirely with software. AT&T Corporation, for example, has implemented level 2 of a HDLC controller entirely in software. Although this implementation is very flexible, it has other fundamental problems. First, the development cost is extremely high, and second, the software uses up a great deal of memory and processing power, making it impossible for the IC to carry out other tasks which may be performed by competing ICs.

Most HDLC-controller ICs implement layer 2 in some combination of hardware and software. Advanced Micro Devices, Inc., (AMD) for example, manufactures HDLC controllers which implement layer 2 in a combination of hardware and software. The problem with these existing HDLC controllers is that they still have a relatively high degree of hardware complexity. The design approach in the past has been to design a circuit, or insert a separate counter or other component, for each of the functions to be performed by the IC. These circuits and counters are then connected to complete the IC. This design process has resulted in ICs having redundant hardware as well as a series of shift registers and comparators to perform the de-formatting functions. This complexity has added to the cost of HDLC ICs, and has ultimately reduced the ICs' flexibility.

It would be a distinct advantage to have a simplified HDLC controller which implements in one simple logic device, the functions of flag and abort detection, zero deletion, detection of in-frame and out-of-frame conditions, and which also performs the functions of a state machine which controls the whole process. It would further be advantageous to provide such a HDLC controller without redundant hardware, with a reduced number of shift registers, and without complex and expensive comparator circuits.

SUMMARY OF THE INVENTION

In one aspect the present invention is a high-level data-link controller (HDLC) receiver state machine for controlling the data-receiving functions of a HDLC receiver which receives frames of serialized data over a data-link. The state machine comprises a single logic device on an integrated circuit which is capable of determining in-frame status of received data, performing zero-deletions when the received data are in-frame, detecting abort signals within the received data, and controlling the means for determining in-frame status, the means for performing zero-deletions, and the means for detecting abort signals.

In another aspect, the present invention is a receiver for receiving frames of serialized data over a high-level data-link, and for storing the received data until the data are read by a controlling microprocessor. The receiver comprises a single logic device on an integrated circuit which performs the functions of detecting frame opening flags, abort signals, and frame closing flags within the received data; deleting non-data-carrying zeros; and generating a gated clock signal. The receiver further comprises a shift register for converting the serialized data into parallel data, a cyclical redundancy check (CRC) checker for validating the frames of received data, and a first-in, first-out (FIFO) buffer for storing the parallel data until the data are read by the controlling microprocessor.

In still another aspect, the present invention is a method of controlling the data-receiving functions of a high-level data-link controller (HDLC) receiver which receives frames of serialized data over a data-link, utilizing a HDLC-receiver state machine comprising a single logic device on an integrated circuit. The method comprises the steps of determining in-frame status of received data, performing zero-deletions when the received data are in-frame, detecting abort signals within the received data, and controlling the means for determining in-frame status, the means for performing zero-deletions, and the means for detecting abort signals.

BRIEF DESCRIPTION OF THE DRAWING

The invention will be better understood and its numerous objects and advantages will become more apparent to those skilled in the art by reference to the following drawing, in conjunction with the accompanying specification, in which:

FIG. 9 illustrates the control bits stored in the HDLC control register in accordance with the teachings of the present invention;

FIG. 10 illustrates the status bits stored in the HDLC-receiver status register in accordance with the teachings of the present invention; and FIG. 11 illustrates the enable bits stored in the HDLC-receiver interrupt enable register in accordance with the teachings of the present invention.

DETAILED DESCRIPTION

Figure 2:
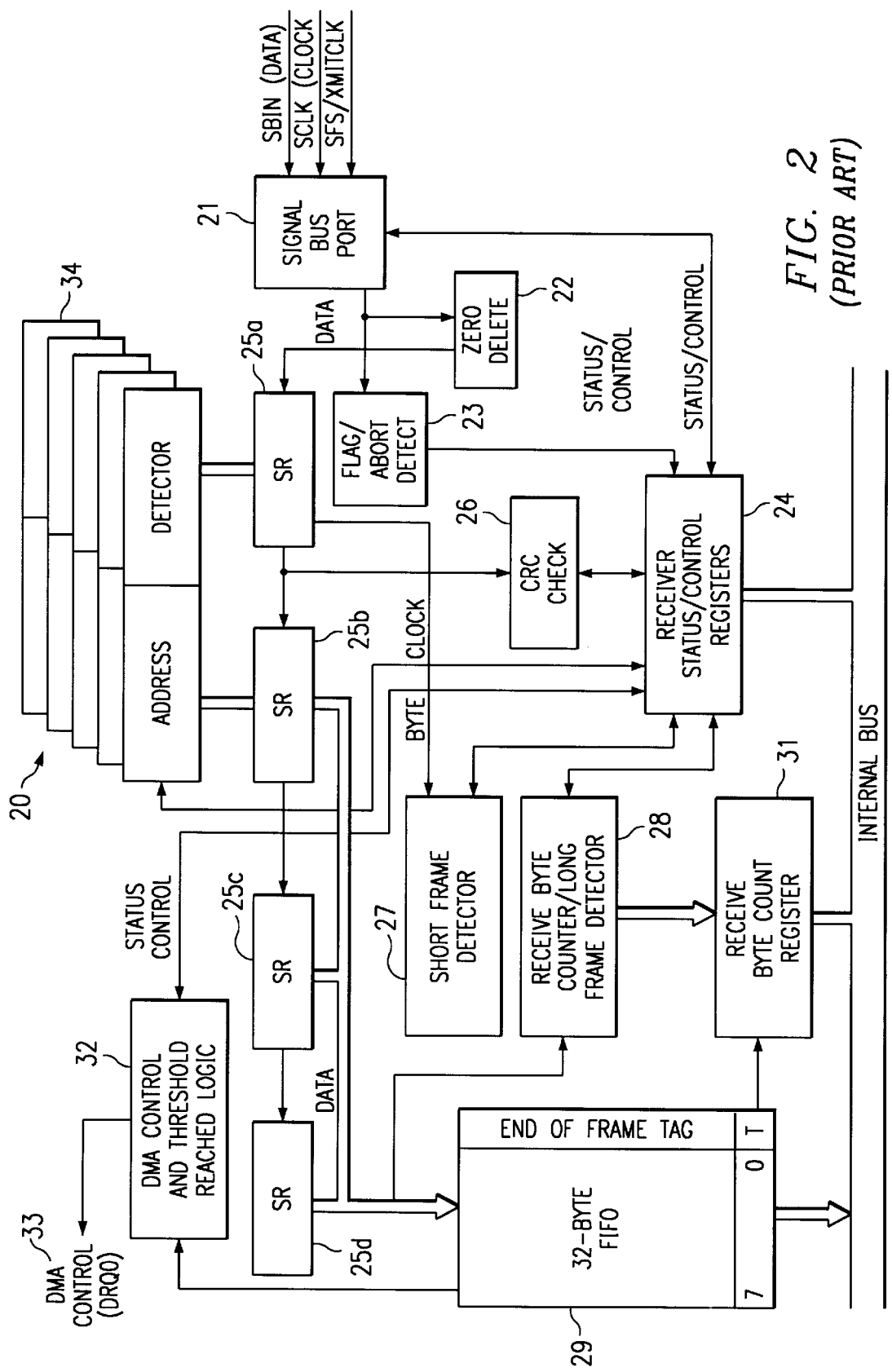
FIG. 2 (Prior art) is a block diagram of an existing HDLC receiver.

FIG. 2 is a block diagram of an existing HDLC receiver 20. Serial data is received through the serial bus port 21. From the port 21, the data is passed through a zero delete circuit 22 and through a flag/abort detection circuit 23. Status and control information is passed back and forth between the serial bus port 21 and a set of receiver status/control registers 24. Data from the flag/abort detection circuit 23 is also passed to the receiver status/control registers 24. Following the zero deletion circuit 22, data is passed through a series of shift registers 25a–25d where data comparison may be performed. Following shift register 25a, data is also passed to a cyclical redundancy check (CRC) checker circuit 26 where the received data frame is validated.

The result of this validity check is passed from the CRC checker 26 to the receiver status/control registers 24.

Data from shift register 25a, and data from the receiver status/control registers 24 also passes to a short frame detector circuit 27. The minimum acceptable length of a frame depends on the specific protocol being used in a particular receiver, and if the short frame detector 27 detects a received frame which is shorter than the minimum acceptable length, this information is passed to the receiver status/control registers 24, and the frame is dropped. Likewise, a receive byte counter/long frame detector 28 determines if a received frame is too long. A frame is too long if it will overrun the receiver's buffers. When a long-frame condition is detected by the receive byte counter/long frame detector 28, the result is immediately sent to a receive byte counter register 31, and the data is discarded. Status and control information from the receiver status/control registers is also passed to a direct memory access (DMA) control and threshold-reached logic circuit 32, and subsequently to a DMA control 33. The receiver also performs address detection in an address detector 34, but this function is not pertinent to the present invention, and will not be discussed further.

Figure 3:
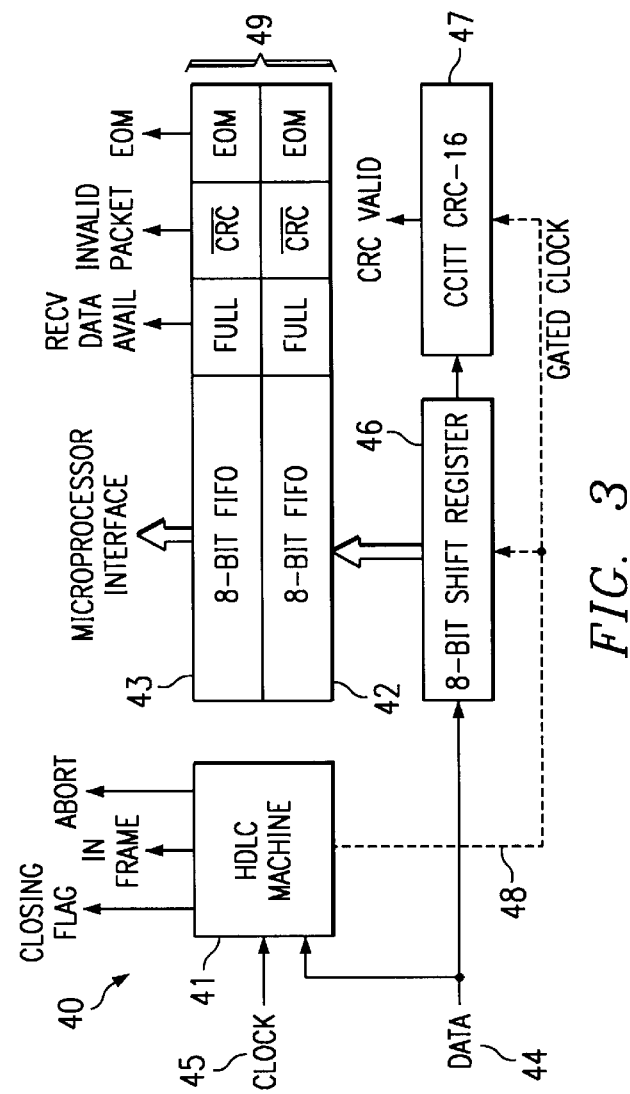
FIG. 3 is a block diagram of a greatly simplified HDLC receiver constructed in accordance with the teachings of the present invention.

A block diagram of a greatly simplified HDLC receiver 40 constructed in accordance with the teachings of the present invention is shown in FIG. 3. An HDLC-receiver state machine 41 replaces the zero deletion circuit 22, the flag/abort detection circuit 23, and the shift registers 25 a–c used in the existing HDLC receiver 20 of FIG. 2. In addition, the large 32-byte FIFO buffer 29 of FIG. 2 is replaced by a two-word-deep receive FIFO buffer 49. Inputs to the HDLC-receiver state machine comprise the serial data stream 44 from the HDLC transmitter and a clock input 45. The HDLC-receiver state machine 41 performs the functions of opening flag detection; detection of the first non-flag, non-abort character, i.e., determination of in-frame status; zero deletion; closing flag detection, i.e., out-of-frame determination; and abort detection.

The serial data stream 44 enters the simplified HDLC receiver 40 at the left side of FIG. 3 where the data is directed to the HDLC-receiver state machine 41 and to an 8-bit shift register 46. From the 8-bit shift register 46, the data is passed to a standard CCITT CRC-16 CRC checker 47 for frame validation. A gated clock signal 48 is sent from the HDLC-receiver state machine 41 to the 8-bit shift register 46 and the CRC checker 47. The 8-bit shift register 46 converts the serial data stream 44 into 8-bit words that can be loaded into the two layers 42 and 43 of the receive FIFO buffer 49. Data is received by the 8-bit shift register 46 when a master receive clock (not shown) is gated on. The master receive clock is gated on when the receiver is in-frame, and is gated off when the receiver is out-of-frame or when deleting zeros.

Still referring to FIG. 3, the receive FIFO buffer 49 may comprise a two-word deep buffer connecting the 8-bit shift register 46 to a data bus comprising a microprocessor interface. Each word stored in the receive FIFO buffer 49 contains eight data bits and three status bits: a FIFO location "Full" bit, a CRC bit, and an end-of-message (EOM) bit. As each byte is received by the HDLC receiver 40, the byte is loaded into the receive FIFO 49, but is not allowed to advance until the next byte, or closing flag is detected. At that time, the Full bit is set as well as the EOM bit if a closing flag is detected, and the CRC bit is set to "invalid" if the CRC does not check. After the status bits are set, the byte is allowed to advance in the FIFO.

Figure 4:
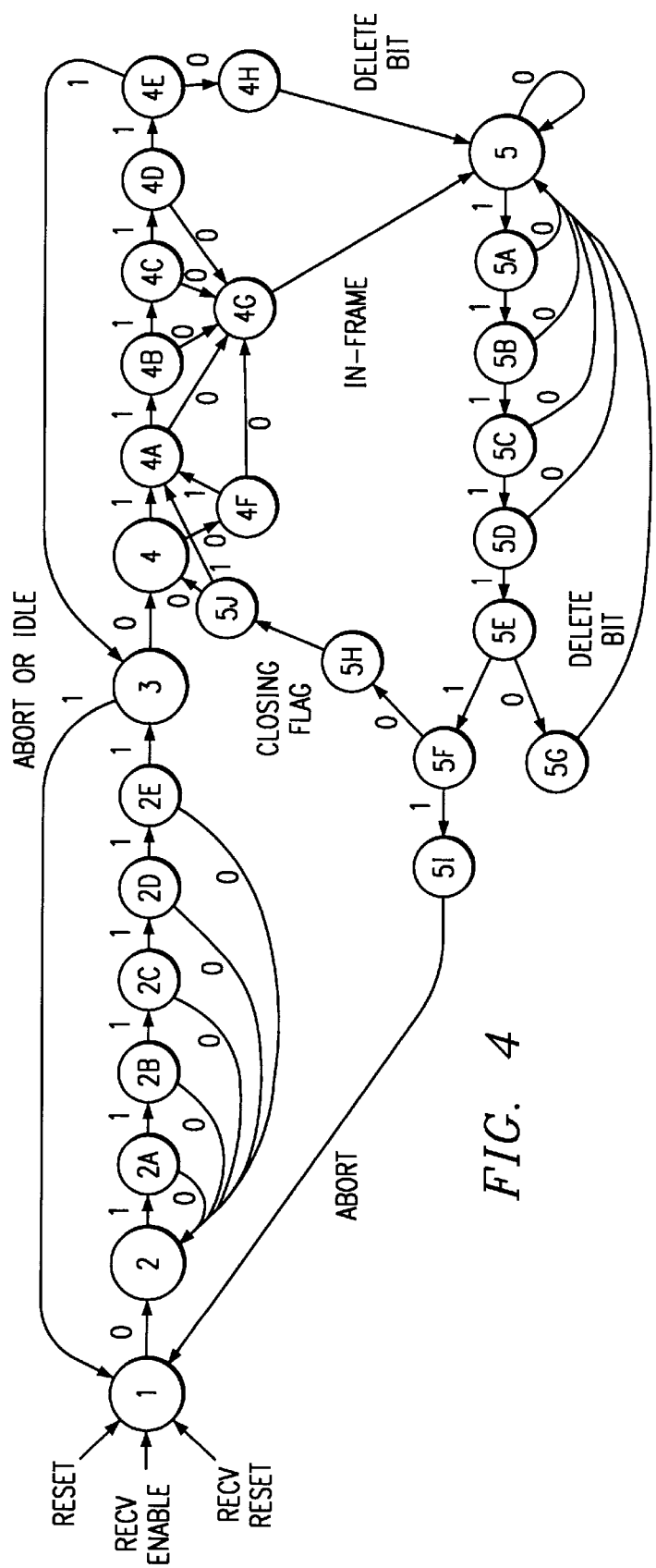
FIG. 4 is a flow chart indicating the various states in the decision-making process of an HDLC-receiver state machine 41 constructed in accordance with the teachings of the present invention.

FIG. 4 is a flow chart indicating the various states in the decision-making process of the HDLC-receiver state machine 41. State 1 is the state of the machine 41 when the receiver 40 is first enabled or reset. When a zero (0) is detected, the machine moves to state 2. State 2 comprises the base state and five sub-states, 2A–2E. In state 2, the machine looks for six contiguous ones (111111), indicating a possible opening flag, abort signal, or idle condition. Each time a one (1) is detected, a counter is incremented and the machine moves to the next sub-state of state 2. The counter is cleared whenever a zero (0) is detected before six contiguous ones are received, and the machine returns to state 2. If six contiguous ones are detected, the machine moves to state 3. If another one (1) is detected in state 3, totaling seven contiguous ones, the machine recognizes an abort or idle signal and returns to state 1. If, instead, a zero (0) is detected in state 3, then the signal for a flag (01111110) is recognized, and the machine moves to state 4.

State 4 comprises the base state and eight sub-states, 4A–4H. If the first bit received in state 4 is a one (1), the machine moves to state 4A. If the first bit received is a zero (0), the machine moves to state 4F where the second bit is inspected. If the second bit is also a zero (0), then the machine determines that the received character is not a flag or abort signal, and goes "in-frame" at state 4G. State 4G then transitions directly to state 5. However, if the second bit in state 4F is a one (1), there is still a possibility that the received character is a flag or abort signal, and therefore, the machine moves to state 4A. In states 4A, 4B, 4C, and 4D subsequent bits are inspected in turn, and if any one of them is a zero (0), the machine recognizes that the received character is not a flag or abort signal, and goes in-frame at state 4G. If, however, the machine continues to receive ones (1) in states 4A–4D, then the machine enters state 4E.

If a one (1) is received in state 4E, then the machine has received six ones in a row, and a flag is recognized. The machine then returns to state 3. However, if a zero (0) is received in state 4E, the machine recognizes this zero as a zero inserted by the HDLC transmitter to validate the signal and preclude it from being interpreted as a flag or abort signal. Therefore, the machine goes in-frame to state 4H and deletes this bit. State 4H then transitions directly to state 5.

State 5 is entered after state 4G or 4H, and has nine sub-states, 5A–5I. If the first bit received in state 5 is a zero (0), then no transition takes place, and the machine remains in state 5. If the first bit received is a one (1), then the machine moves to state 5A. In states 5A, 5B, 5C, and 5D subsequent bits are inspected in turn, and if any one of them is a zero (0), the machine recognizes that the received character is not a flag or abort signal, and returns to state 5. If, however, the machine continues to receive ones (1) in states 5A–5D, then state 5E is entered.

In state 5E, the machine has received five ones in a row. Therefore, if a zero (0) is then received, the machine recognizes this zero as a zero inserted by the HDLC transmitter to validate the signal and preclude it from being interpreted as a flag or abort signal. Therefore, the machine deletes this bit and returns to state 5. If, however, at state 5E, a sixth one (1) is received, the machine recognizes a closing flag or possible abort signal, and moves to state 5F.

In state 5F, the next bit is inspected, and if it is a seventh one (1), then an abort signal is recognized, and the machine moves to state 5I. In state 5I, an abort indication is activated, a status bit is set in the HDLC status register, and the machine resets to state 1. If, however, at state 5F, a zero (0) is received, then the machine recognizes a closing flag and moves to state 5H. In state 5H, a closing flag indication is activated, indicating an out-of-frame condition. In addition, a status bit is set in the HDLC status register, and the machine moves to state 5J.

In state 5J, the machine determines whether the character following the closing flag begins with a zero (0) or a one (1). The closing flag may be an opening flag for a new packet, therefore, if the next bit is a one (1), the machine moves to state 4A. However, if at state 5J, the next bit is a zero (0), then the machine moves to state 4.

Still referring to FIG. 4, it should be noted that the counting function performed in states 2, 4, and 5 is identical. In each state, if a one (1) is received, the counter is incremented, and the machine moves to the next sequential sub-state. If a zero (0) is received, the machine either moves to a different state or returns to the base state in which it is currently operating, e.g., to state 2 from state 2C. In past HDLC controllers, the functions performed in states 2, 4, and 5 were implemented with separate circuits or counters, adding unnecessary redundancy and cost to the IC. In the present invention, the functions of states 2, 4, and 5 may be implemented using a single 3-bit counter, further reducing redundant hardware in the HDLC receiver.

Figure 5:
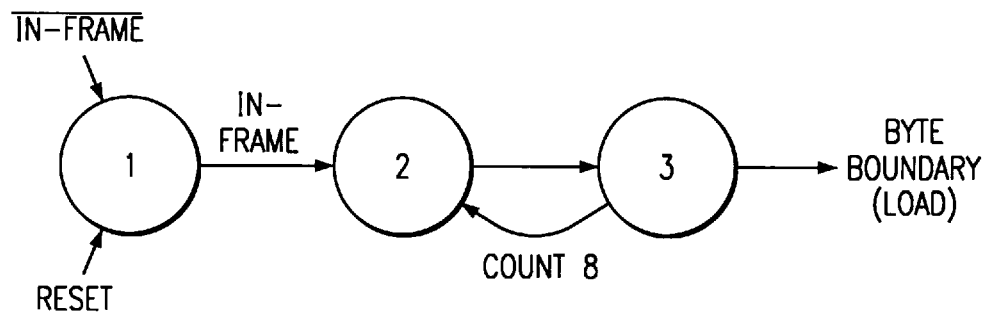
FIG. 5 is a flow chart of the functions performed by an 8-bit shift register constructed in accordance with the teachings of the present invention.

FIG. 5 is a flow chart of the functions performed by the 8-bit shift register 46 (FIG. 3). As noted earlier, the 8-bit shift register 46 converts the serial data stream 44 into 8-bit words that can be loaded into the FIFO buffers 42 and 43. The 8-bit shift register 46 is in state 1 when the receiver is reset or otherwise not in-frame. When the HDLC-receiver state machine (FIG. 4) goes in-frame, the 8-bit shift register 46 moves to state 2 where a 3-bit counter (not shown) is reset. The 8-bit shift register 46 then moves to state 3 where the 3-bit counter is incremented each time a gated clock signal is received, i.e., each time a data bit is shifted into the shift register. When the counter reaches 8, the shift register 46 is full, and a FIFO load signal is sent to the 8-bit FIFO buffers 42 and 43. The shift register then returns to state 2 where the 3-bit counter is reset.

Figure 6:
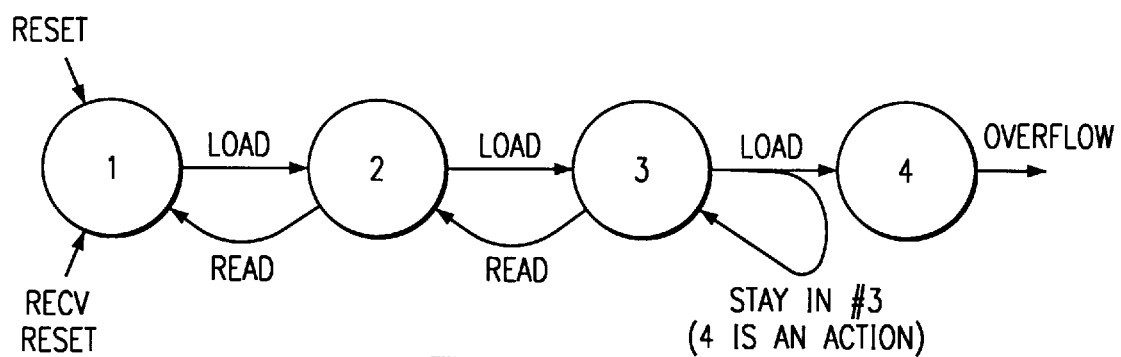
FIG. 6 is a flow chart of the functions performed by an 8-bit FIFO receive buffer constructed in accordance with the teachings of the present invention.

FIG. 6 is a flow chart of the functions performed by the FIFO receive buffer 49. State 1, the idle state, is entered when the HDLC receiver is reset, when the HDLC controller is first turned on, or when the FIFO buffer 49 becomes empty. The buffer moves to state 2 when a byte of data is loaded into the FIFO buffer 49 from the 8-bit shift register 46. The buffer moves to state 3 when a second and final byte of data is loaded into the two-word-deep FIFO buffer 49. In state 2 and state 3, the buffer generates a "data available" flag which is sent to the microprocessor interface. Whenever a byte of data is read by the microprocessor, the buffer 49 returns to the next lower state, e.g., to state 2 from state 3, or to state 1 from state 2. If the shift register 46 attempts to load another byte of data when two bytes are already loaded, the buffer enters state 4. In state 4, the load is blocked, an overrun flag is set, and the buffer returns to state 3.

Figure 7:
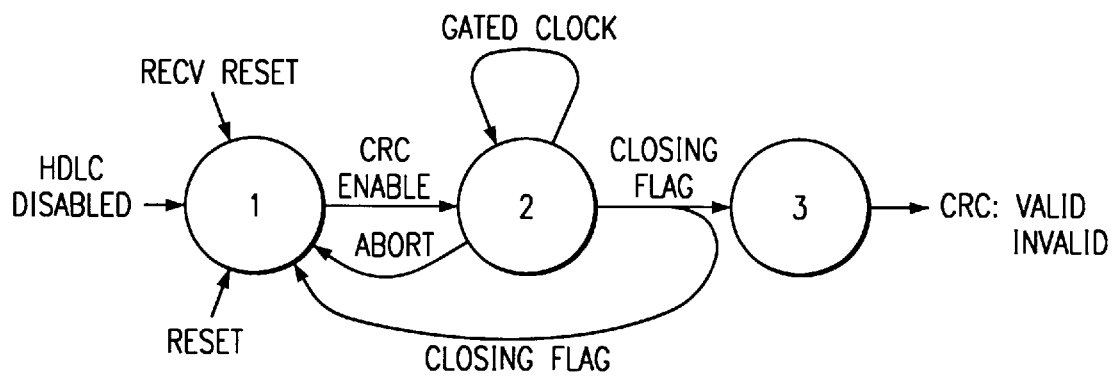
FIG. 7 is a flow chart of the functions performed by a cyclical redundancy check (CRC) checker constructed in accordance with the teachings of the present invention.

FIG. 7 is a flow chart of the functions performed by the CRC checker 47. The CRC checker 47 is initially loaded with all ones (1s), and checked for an FOB8 hex after the complete packet 17 (FIG. 1), including the transmitted frame check sequence 15 has been received. The CRC checker 47 enters state 1, the idle state, when the HDLC receiver is reset, when the HDLC controller is first turned on, when an abort signal is received while in-frame, or when a closing flag 16 is detected. State 2 is entered from state 1 when the HDLC receiver goes in-frame and the CRC checker 47 is enabled. In state 2, the CRC is calculated on each received bit (except deleted zeros), as clocked in by the gated clock signal 48 from the HDLC-receiver state machine 41 (FIG. 3). When a closing flag 16 is detected by the HDLC-receiver state machine 41, the CRC calculation is complete. The closing flag 16 is now in the 8-bit shift register 46, and has not been shifted into the CRC checker 47. The CRC checker 47 then moves to state 3. In state 3, the contents of the CRC checker 47 is compared to FOB8 hex. A match indicates a valid packet; no match indicates an error, and a CRC error bit ("invalid packet" in FIG. 3) is set. Receipt of the closing flag 16 also causes the CRC checker 47 to return to state 1.

Figure 8:
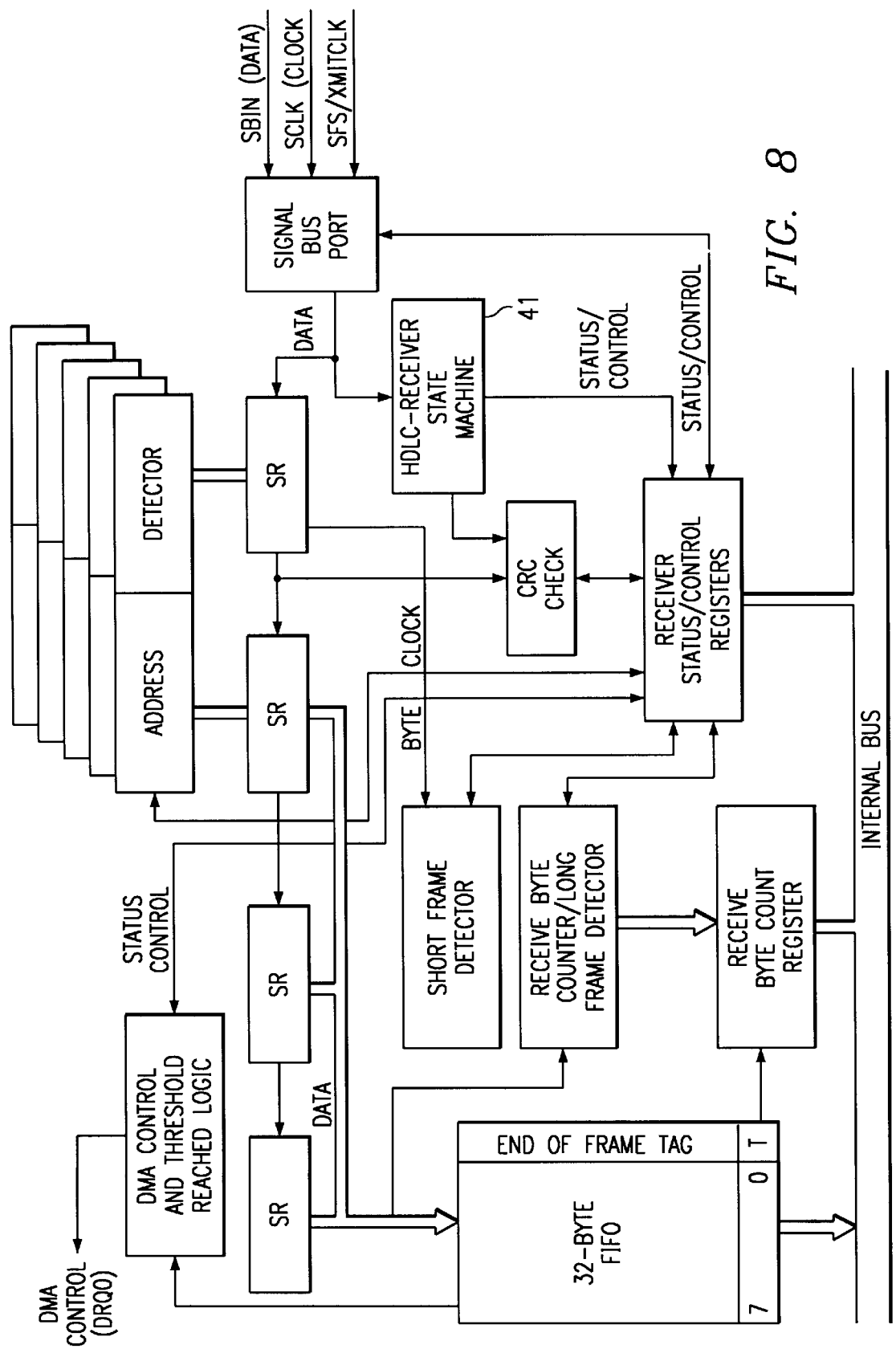
FIG. 8 is a block diagram of the HDLC receiver of FIG. 2 modified with a HDLC-receiver state machine constructed in accordance with the teachings of the present invention.

In an alternative embodiment, the HDLC-receiver state machine of the present invention may be utilized in a more complex HDLC receiver similar to the receiver shown in FIG. 2. FIG. 8 is a block diagram of the HDLC receiver of FIG. 2 modified with the HDLC-receiver state machine 41 of the present invention. It may be seen that the HDLC-receiver state machine 41 replaces the zero deletion circuit 22 and flag/abort detection circuit 23 of FIG. 2.

In yet another embodiment, the HDLC-receiver state machine 41 of the present invention may be integrated with an instruction processor on a single integrated circuit. Such a processor may be, for example, a high performance, general purpose microprocessor such as a 32-bit microprocessor implemented in complementary metal-oxide semiconductor (CMOS) technology.

FIG. 9 illustrates the control bits stored in the HDLC control register 24, with bit 4 controlling the rejection of received frames in accordance with the teachings of the present invention. All other bits are standard HDLC control bits. If bit 4 (Receive Frame Reject) is set to one (1) while the receiver is in-frame, the receiver is forced out-of-frame, looking for an opening flag 11 (FIG. 1), and the receive FIFO buffer 49 (FIG. 3) is cleared. In addition, bit 4 is cleared to zero (0) when the receiver goes out-of-frame. If a one (1) is written to bit 4 while the receiver is out-of-frame, no action is taken, and the bit is not set. Therefore, bit 4 always reads back as zero (0) since setting the bit to one (1) while in-frame causes the receiver to go out-of-frame, clearing the bit to zero (0).

FIG. 10 illustrates the status bits stored in the HDLC-receiver status register 24, with bits 0–4 reporting the status of various receiver functions in accordance with the teachings of the present invention. Each of these bits, combined through an AND function with an associated enable bit, generates an interrupt when set to one (1). The enable bits are illustrated in FIG. 11 and described below. Bit 0 is set to one (1) anytime that the receive FIFO buffer 49 has data in it. Bit 1 is set to one (1) whenever the receiver attempts to load a byte of data into the FIFO buffer 49, and the load is blocked because the FIFO buffer 49 is full. Bit 1 is cleared to zero (0) each time the HDLC-receiver status register 24 is read.

Figure 1:
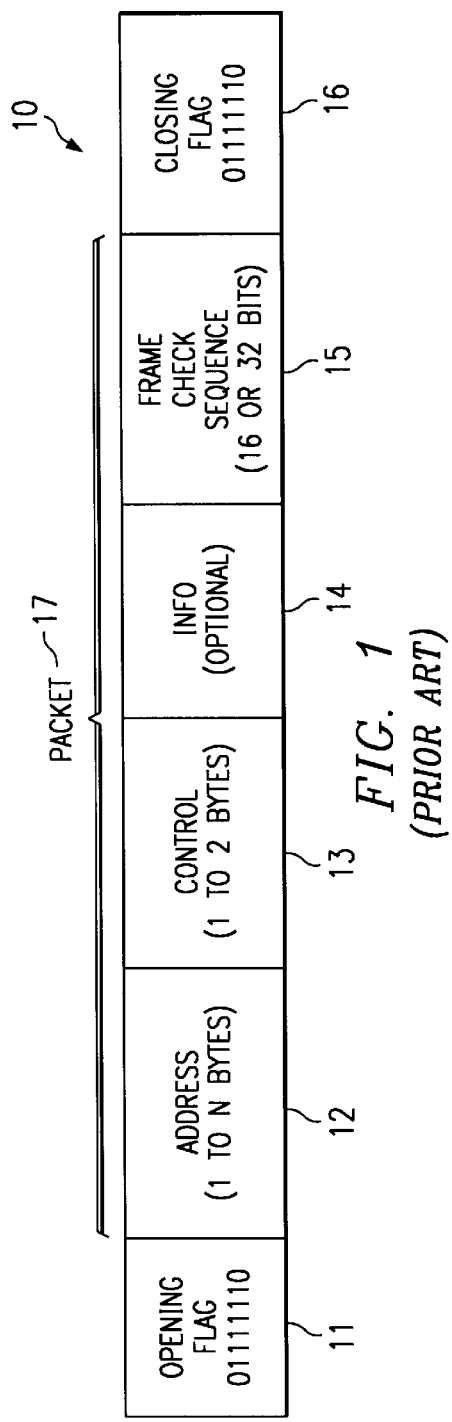
FIG. 1 (Prior art) illustrates the basic HDLC frame format used in existing HDLC systems.

Bit 2 is set to one (1) when the data byte in the upper location 43 of the FIFO buffer 49 (the location the user processor can read) is tagged by having its end of message (EOM) bit set to one (1) (see FIG. 3). The EOM bit indicates that this byte is the last byte of the data packet 17 (FIG. 1). Bit 2 is cleared to zero (0) when the tagged byte is read out of the FIFO buffer 49. Bit 3 is set to one (1) when the data byte in the upper location 43 of the FIFO buffer 49 is tagged by having its CRC bit cleared to zero (0) indicating that it is the last byte of a packet and that the CRC check failed. Bit 3 is cleared to zero (0) when the tagged byte is read out of the FIFO buffer 49.

The last active bit is bit 4. Bit 4 is set to one (1) when an abort signal is received while the receiver is in-frame. As a result of the abort signal, the receiver enters an abort condition and flushes the FIFO buffer 49. Bit 4 is cleared to zero (0) when the HDLC-receiver status register 24 is read. Bits 5–7 are reserved for reporting the status of future functions of the receiver.

FIG. 11 illustrates the enable bits stored in the HDLC-receiver interrupt enable register, with bits 0–4 enabling and disabling interrupts in the HDLC receiver of the present invention when combined through an AND function with status bits from the HDLC-receiver status register (FIG. 10). When bit 0 is set to one (1), an interrupt is reported anytime there is data in the receive FIFO buffer 49. When bit 0 is cleared to zero (0), interrupts are blocked. When bit 1 is set to one (1), an interrupt is reported if an overrun of the receive FIFO buffer 49 occurs. When bit 1 is cleared to zero (0), interrupts are blocked. When bit 2 is set to one (1), an interrupt is reported if the data byte in the upper location 43 of the FIFO buffer 49 is tagged as the last byte of the packet 17 by having its EOM bit set to one (1). When bit 2 is cleared to zero (0), interrupts are blocked. When bit 3 is set to one (1), an interrupt is reported if the data byte in the upper location 43 of the FIFO buffer 49 is received with an invalid CRC check. When bit 3 is cleared to zero (0), interrupts are blocked.

Bit 4 is the last active bit in the HDLC-receiver interrupt enable register. When bit 4 is set to one (1), an interrupt is reported if an abort signal is detected while in-frame. When bit 4 is cleared to zero (0), interrupts are blocked. Bits 5–7 are reserved for future functions of the receiver.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. A high-level data-link controller (HDLC) receiver which receives, at an input port, a data stream of frames of serialized data over a data link and which has data-receiving functions and a receiver state machine for controlling said data-receiving functions, said receiver comprising:
   a single integrated circuit, said integrated circuit comprising:
      means for determining in-frame status of received data;
      means for performing zero-deletions when said received data are in-frame;
      means for detecting abort signals within said received data;
      hardware-based means for controlling said means for determining in-frame status, said means for performing zero-deletions, and said means for detecting abort signals, wherein each of said means for determining in-frame status, said means for performing zero deletions, and said means for detecting abort signals is connected to said data stream and to said means for controlling;
   a converter coupled to said single integrated circuit, said converter for converting said serialized data into a plurality of data words;
   a buffer coupled to said converter, said buffer for storing said plurality of data words, said buffer including a first portion for an end-of-message indication, a second portion for an indication that said buffer is full and a third portion for an indication of an invalid data frame; and
   a frame validator coupled to said converter for validating said frames of said serialized data,
   wherein said hardware-based means generates a gated clock signal when said receiver is in-frame, which signal is provided at each of said converter and said frame validator.

2. The HDLC receiver of claim 1 wherein said means for detecting in-frame status of received data includes:
   means for detecting frame opening flags; and
   means for detecting frame closing flags.

3. The HDLC receiver of claim 2 wherein said means for detecting frame opening flags includes means for detecting a series of eight data bits comprising a zero followed by six contiguous ones and another zero, said data bits being received out-of-frame.

4. The HDLC receiver of claim 3 wherein said means for detecting frame closing flags includes means for detecting a series of eight data bits comprising a zero followed by six contiguous ones and another zero, and said data bits being received in-frame.

5. The HDLC receiver of claim 2 wherein a single 3-bit counter is programmed to detect said frame opening flags when said data are out-of-frame, to detect said frame closing flags when said data are in-frame, to detect abort signals, and to perform zero-deletions when said data are in-frame.

6. The HDLC receiver of claim 1 wherein said means for performing zero-deletions includes:
   means for detecting in said data, five contiguous ones followed by a zero; and
   means for deleting said zero from said data bits.

7. The HDLC receiver of claim 1 wherein said means for detecting abort signals within said received data includes means for detecting a series of data bits comprising at least seven contiguous ones.

8. A receiver for receiving at an input port a data stream of frames of serialized data over a high-level data-link, and for storing said received data until said data are read by a microprocessor, said receiver comprising:
   a state machine effectuated on a single integrated circuit for detecting frame opening flags, abort signals, and frame closing flags within said received data; for deleting non-data-carrying zeros; and for generating a gated clock signal when said receiver is in-frame; said state machine being controlled via hardware-based means;
   a shift register external to said state machine for converting said serialized data into parallel data;
   a cyclical redundancy check (CRC) checker external to said state machine for validating said frames of received data; and
   a two-word-deep first-in, first-out (FIFO) buffer external to said state machine for storing said parallel data until said data are read by said microprocessor, each word of said two-word-deep FIFO buffer including a data portion in addition to a first portion for an end-of-message indication, a second portion for an indication that said data portion is full and a third portion for an indication of an invalid data frame, wherein said state machine and said shift register are both connected directly to said input port, and wherein said CRC checker and said FIFO buffer are both connected to said shift register.

9. An instruction processor implemented on a single integrated circuit, said instruction processor comprising:

a microprocessor;

a high-level data-link controller (HDLC) receiver for receiving from a data port a data stream of frames of serialized data over a high-level data-link, and for storing said received data until said data are read by said microprocessor, said HDLC receiver comprising:

a state machine formed on said integrated circuit for detecting frame opening flags, abort signals, and frame closing flags within said received data; for deleting non-data-carrying zeros; and for generating a gated clock signal when said receiver is in-frame; said state machine being controlled via hardware-based means;

a shift register for converting said serialized data into parallel data;

a cyclical redundancy check (CRC) checker for validating said frames of received data; and a two-word-deep first-in, first-out (FIFO) buffer for storing said parallel data until said data are read by said microprocessor, each word of said two-word-deep FIFO buffer including data portion in addition to a first portion for an end-of-message indication, a second portion for an indication that said FIFO buffer is full and a third portion for an indication of an invalid data frame, wherein said state machine and said shift register are both connected directly to said input port, wherein said CRC checker and said FIFO buffer are both connected to said shift register and wherein said state machine is coupled to a CRC checker for CRC receive function capability.

10. The instruction processor of claim 9 wherein said high-performance, general-purpose microprocessor is a 32-bit microprocessor.

11. The instruction processor of claim 10 wherein said 32-bit microprocessor is implemented in complementary metal-oxide semiconductor (CMOS) technology.

* * * * *